United States Patent
Matsuno et al.

(10) Patent No.: US 8,055,420 B2
(45) Date of Patent: Nov. 8, 2011

(54) VEHICLE CONTROL DEVICE

(75) Inventors: Koji Matsuno, Tokyo (JP); Takeshi Yoneda, Tokyo (JP); Masato Igarashi, Tokyo (JP); Yosuke Morokuma, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 927 days.

(21) Appl. No.: 12/071,698

(22) Filed: Feb. 25, 2008

(65) Prior Publication Data
US 2008/0221770 A1 Sep. 11, 2008

(30) Foreign Application Priority Data
Feb. 26, 2007 (JP) ................................. 2007-046197

(51) Int. Cl.
*G05D 1/00* (2006.01)

(52) U.S. Cl. ............... 701/69; 701/44; 701/89; 180/247
(58) Field of Classification Search .................... 701/69, 701/89, 41, 44; 180/233, 247, 248, 244
See application file for complete search history.

(56) References Cited

U.S. PATENT DOCUMENTS

| 7,463,964 | B2 * | 12/2008 | Ushiroda et al. | 701/80 |
| 7,487,028 | B2 * | 2/2009 | Shigeta et al. | 701/90 |
| 2007/0021887 | A1 * | 1/2007 | Hofmann et al. | 701/40 |
| 2008/0183353 | A1 * | 7/2008 | Post et al. | 701/42 |
| 2008/0201051 | A1 * | 8/2008 | Yoneda et al. | 701/88 |

FOREIGN PATENT DOCUMENTS

JP 11-59366 3/1999

OTHER PUBLICATIONS

Machine Translation of JP 11-059366, Miyazaki et al., Mar. 1993.*

* cited by examiner

*Primary Examiner* — Kevin Hurley
(74) *Attorney, Agent, or Firm* — Smith, Gambrell & Russell, LLP (57) ABSTRACT

A main controller calculates permissible driving forces of individual wheels from a road-surface friction coefficient, ground loads of the individual wheels, and lateral forces of the individual wheels. The main controller then calculates a permissible engine torque on the basis of the calculated permissible driving forces so as to limit engine output. In addition, based on the calculated permissible driving forces, the main controller calculates a transfer-clutch torque for front-rear driving-force distribution control, a rear-wheel torque shift amount for left-right driving-force distribution control, and a steering-angle correction amount for steering-angle control.

23 Claims, 3 Drawing Sheets

VEHICLE CONTROL DEVICE

CROSS REFERENCES TO RELATED APPLICATIONS

The disclosure of Japanese Patent Application No. 2007-046197 filed on Feb. 26, 2007 including the specifications, drawings, and abstracts are incorporated by references herein.

BACKGROUND OF THE INVENTION

1. Field of the Invention

The present invention relates to vehicle control devices that perform vehicle-behavior control, such as front-rear driving-force distribution control and left-right driving-force distribution control, while realizing maximum traction performance.

2. Description of the Related Art

In recent years, vehicles are equipped with various traction control devices that control engine output in accordance with a driving condition.

For example, Japanese Unexamined Patent Application Publication No. 11-59366 discloses a technology in which a road-surface friction coefficient generated on vehicle wheels and lateral forces generated on the wheels are estimated so as to calculate maximum front-rear forces of the wheels on the basis of these estimated road-surface friction coefficient and lateral forces. Based on the calculated maximum front-rear forces, driving forces or braking forces applied to the wheels are controlled.

When a vehicle equipped with a driving-force control function as disclosed in Japanese Unexamined Patent Application Publication No. 11-59366 has a front-rear driving-force distribution control function and a left-right driving-force distribution control function, a permissible engine output value is unfavorably determined by a drive shaft whose front-rear driving force distribution is excessive with respect to dynamic ground-load distribution or a grip limit of inside turning wheels. Therefore, such a vehicle is problematic in that it cannot realize maximum traction performance where each wheel is utilized at full.

SUMMARY OF THE INVENTION

The present invention has been made under such circumstances, and it is an object of the present invention to provide a vehicle control device that can appropriately control engine output while performing vehicle-behavior control such as front-rear driving-force distribution control and left-right driving-force distribution control to realize maximum traction performance where each wheel is utilized at full.

The present invention provides a vehicle control device that includes road-surface friction coefficient estimating unit configured to estimate a road-surface friction coefficient; ground-load estimating unit configured to estimate ground loads acting on individual wheels; lateral-tire-force estimating unit configured to estimate lateral tire forces acting on the individual wheels; permissible driving-force calculating unit configured to calculate permissible front-rear driving forces of the individual wheels as permissible driving forces on the basis of the road-surface friction coefficient, the ground loads of the individual wheels, and the lateral tire forces of the individual wheels; engine-output controlling unit configured to control engine output on the basis of the permissible driving forces of the individual wheels; and vehicle-behavior controlling unit configured to control vehicle behavior on the basis of the permissible driving forces of the individual wheels.

Accordingly, the vehicle control device of the present invention can appropriately control engine output while performing vehicle-behavior control such as front-rear driving-force distribution control and left-right driving-force distribution control to realize maximum traction performance where each wheel is utilized to the full extent.

DESCRIPTION OF THE PREFERRED EMBODIMENTS

Embodiments of the present invention will now be described with reference to the drawings.

Figure 1:
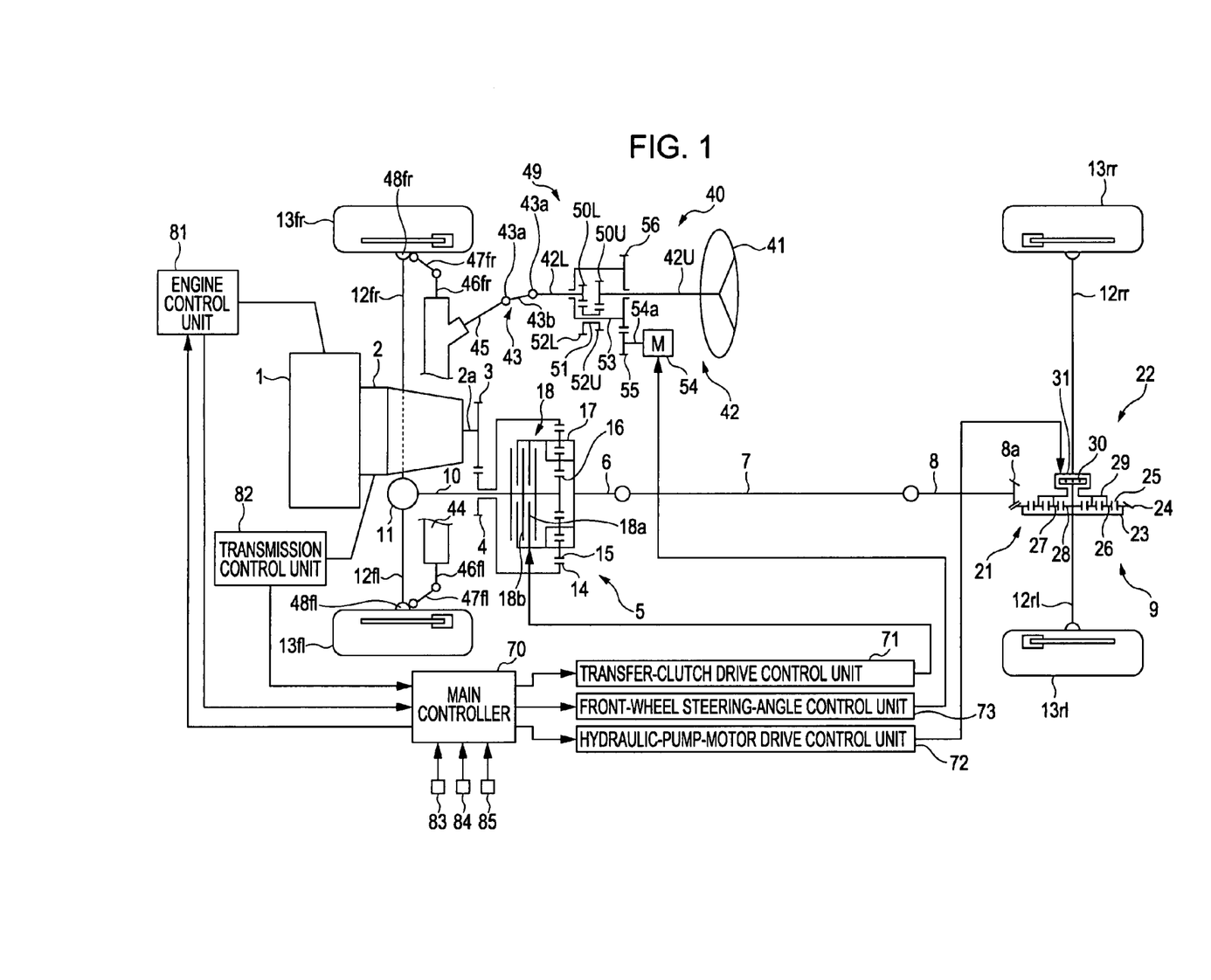
FIG. 1 schematically illustrates a driving system and a steering system of an entire vehicle.
Figure 2:
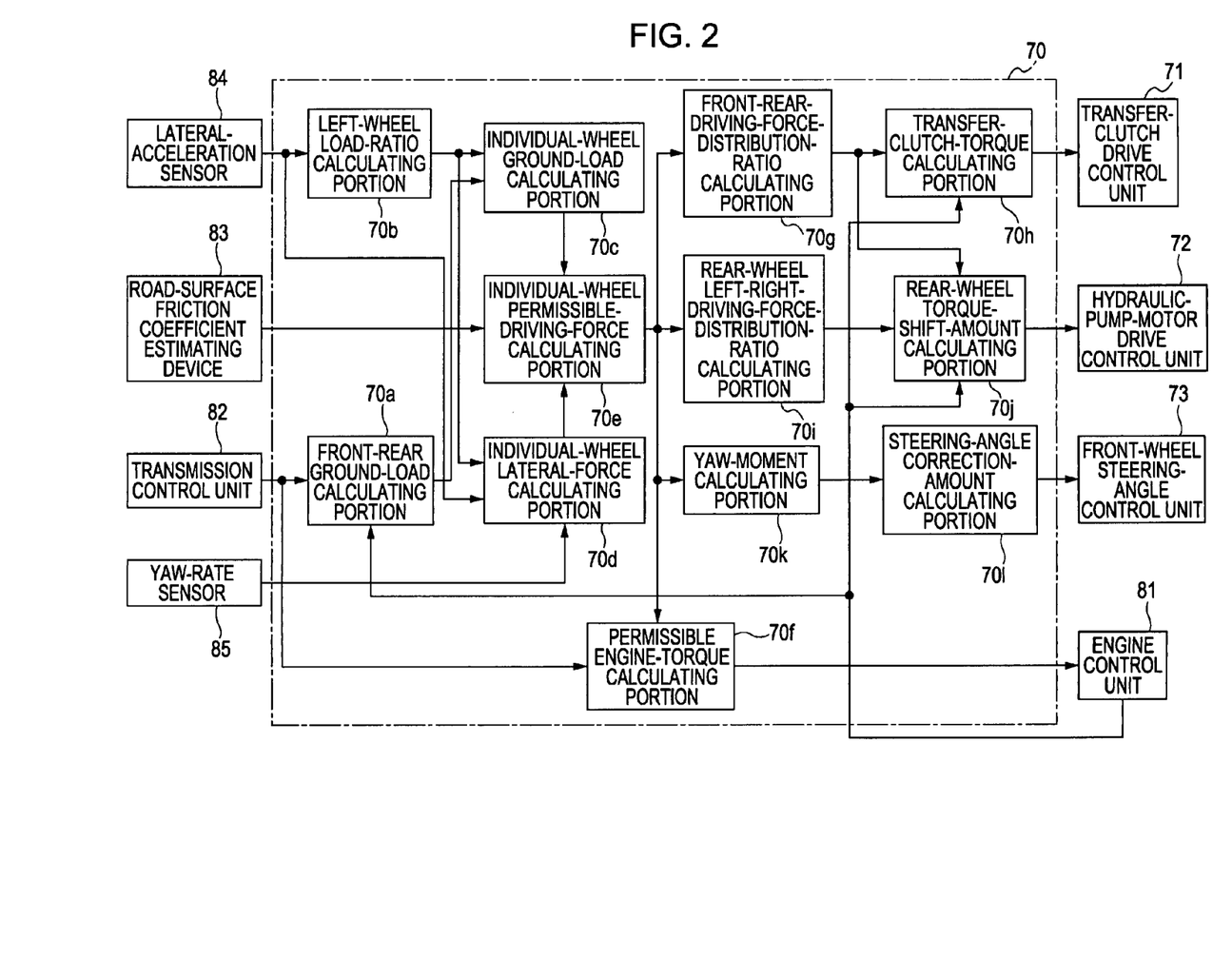
FIG. 2 is a functional block diagram of a main controller.
Figure 3:
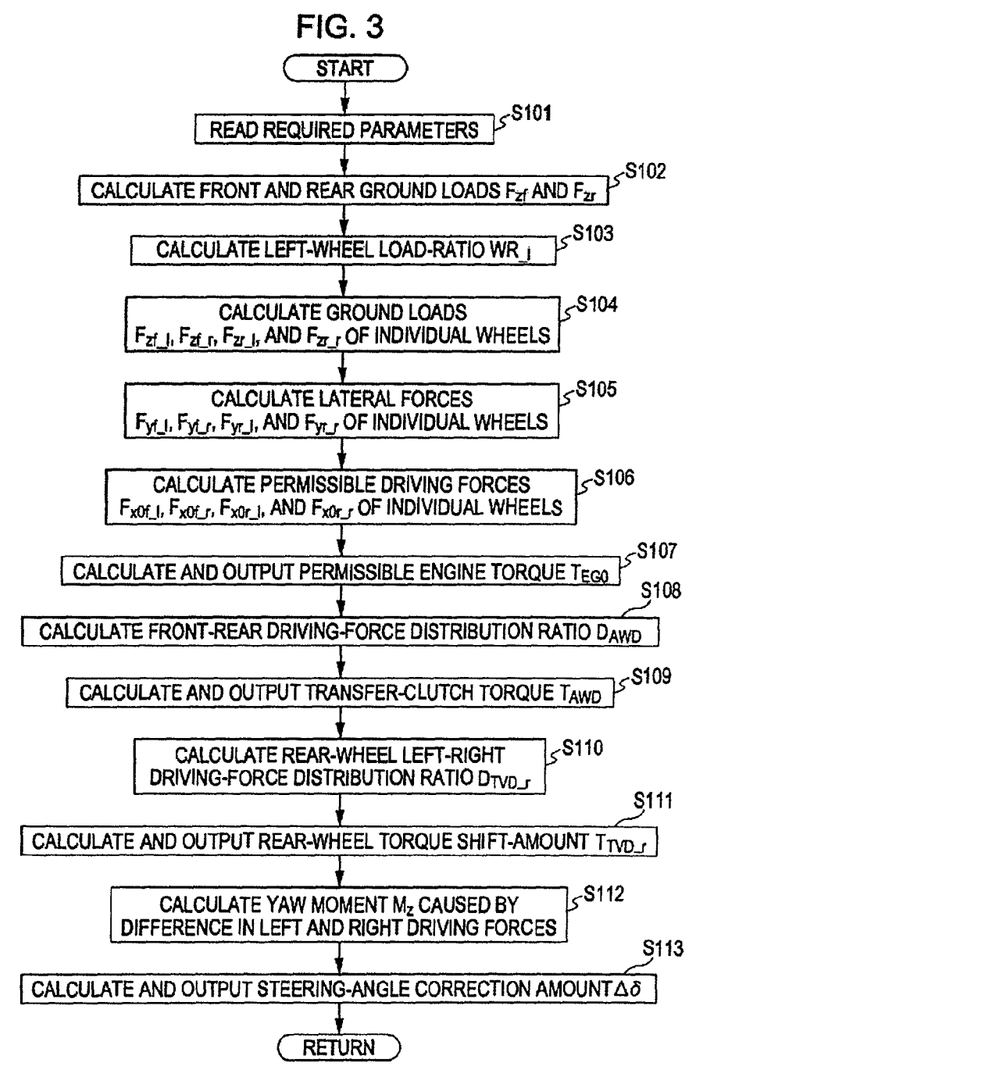
FIG. 3 is a flow chart of a main control program.

FIGS. 1 to 3 illustrate an embodiment of the present invention.

Referring to FIG. 1, reference numeral 1 denotes an engine disposed at a front side of the vehicle. A driving force from the engine 1 is transmitted from an automatic transmission 2 (including a torque converter) located rearward of the engine 1 to a center differential device 5 via a transmission output shaft 2a, a transfer drive gear 3, and a transfer driven gear 4.

The driving force transmitted to the center differential device 5 is input to a rear-wheel final reduction apparatus 9 via a rear drive shaft 6, a propeller shaft 7, and a drive pinion shaft 8, and is also input to a front-wheel final reduction apparatus 11 via a front drive shaft 10.

The driving force received by the rear-wheel final reduction apparatus 9 is transmitted to a left rear wheel 13rl via a left-rear-wheel drive shaft 12rl and to a right rear wheel 13rr via a right-rear-wheel drive shaft 12rr. On the other hand, the driving force received by the front-wheel final reduction gear 11 is transmitted to a left front wheel 13fl via a left-front-wheel drive shaft 12fl and to a right front wheel 13fr via a right-front-wheel drive shaft 12fr.

The center differential device 5 includes a ring gear 14 that is integrated with the transfer driven gear 4. The ring gear 14 is meshed with a double planetary gear 15. The front drive shaft 10 extends rearward and is inserted into a rotary shaft core of the ring gear 14. The front drive shaft 10 is provided with a sun gear 16 that is meshed with the double planetary gear 15.

The double planetary gear 15 is rotatably supported by a carrier 17 that extends forward. The front drive shaft 10 and the carrier 17 have a wet multiplate clutch (transfer clutch) 18 disposed therebetween.

The transfer clutch 18 is constituted by outer plates 18a on an inner surface of the carrier 17 and inner plates 18b on the front drive shaft 10. The outer plates 18a and the inner plates 18b are alternately arranged each other and can be pressed against each other by means of a piston (not shown).

The piston is provided with an electromagnet (not shown) that is driven by a transfer-clutch drive control unit 71, and a pressing force of the piston (i.e. transfer-clutch torque) can electronically be controlled through the transfer-clutch drive control unit 71 in response to a control signal from a main controller 70 to be described hereinafter.

The rear-wheel final reduction apparatus 9 is constituted by a differential mechanism portion 21 and a hydraulic motor 22, as disclosed in, for example, Japanese Unexamined Patent Application Publication No. 2005-54944.

The differential mechanism portion 21 is of a known planetary gear type. In the differential mechanism portion 21, a drive pinion 8a disposed at a rear end of the drive pinion shaft 8 is meshed with a ring gear 24 provided around an outer periphery of a differential casing 23.

A ring gear 25 disposed within the differential casing 23 is meshed with an outer pinion 26. The outer pinion 26 is meshed with an inner pinion 27, which is meshed with a sun gear 28 provided on the left-rear-wheel drive shaft 12rl. The outer pinion 26 and the inner pinion 27 are rotatably supported by a carrier 29, which is linked to the right-rear-wheel drive shaft 12rr.

Accordingly, a driving force input to the drive pinion 8a is transmitted from the sun gear 28 to the left-rear-wheel drive shaft 12rl and also from the carrier 29 to the right-rear-wheel drive shaft 12rr.

The hydraulic motor 22 is a hydraulic motor of radial piston type. In the hydraulic motor 22, a cylinder block 30 that houses a plurality of outwardly projectable pistons (not shown) is linked to the left-rear-wheel drive shaft 12rl, and a motor casing 31 equipped with a cam ring (not shown) having a cam surface on the inner side thereof is linked to the right-rear-wheel drive shaft 12rr. The motor casing 31 is rotatable in the forward and reverse directions with respect to the cylinder block 30.

The hydraulic motor 22 is actuated by a hydraulic-pump-motor drive control unit 72 constituted by, for example, a hydraulic pump and a hydraulic valve unit, such that a required torque is transferred from the left-rear-wheel drive shaft 12rl to the right-rear-wheel drive shaft 12rr or from the right-rear-wheel drive shaft 12rr to the left-rear-wheel drive shaft 12rl. A control signal for driving the hydraulic-pump-motor drive control unit 72 is output from the main controller 70 to be described hereinafter.

A steering system of the vehicle will now be described.

Reference numeral 40 denotes a front-wheel steering device of the vehicle. The front-wheel steering device 40 has a steering shaft 42 that extends from a steering wheel 41. A front end of the steering shaft 42 is linked to a pinion shaft 45, which projects from a steering gear box 44, via a joint portion 43 constituted by universal joints 43a and a joint shaft 43b.

The steering gear box 44 has a tie rod 46fl projecting therefrom towards the left front wheel 13fl and a tie rod 46fr projecting therefrom towards the right front wheel 13fr.

The tie rod ends of the tie rods 46fl and 46fr are respectively linked to axle housings 48fl and 48fr via knuckle arms 47fl and 47fr. The axle housings 48fl and 48fr rotatably support the respective wheels 13fl and 13fr.

An intermediate section of the steering shaft 42 is provided with a front-wheel steering-angle correcting mechanism 49 that adjusts a steering gear ratio. The steering shaft 42 is constituted by an upper shaft portion 42U that extends upward from the front-wheel steering-angle correcting mechanism 49 and a lower shaft portion 42L that extends downward from the front-wheel steering-angle correcting mechanism 49.

The structure of the front-wheel steering-angle correcting mechanism 49 will be described below. A lower end of the upper shaft portion 42U and an upper end of the lower shaft portion 42L respectively have a pair of sun gears 50U and 50L fixed thereto. The pair of sun gears 50U and 50L are concentric to the rotary shaft cores of the respective shaft portions 42U and 42L, and are respectively meshed with planetary gears 52U and 52L that are fixed to a plurality of (e.g. three) pinion shafts 51.

The sun gears 50U and 50L are both housed within a carrier 53 that rotatably supports the pinion shafts 51. Around an upper end of the carrier 53 is provided a driven gear 56 that is meshed with a drive gear 55 fixed to an output shaft 54a of an electric motor 54.

The electric motor 54 is driven by a front-wheel steering-angle control unit 73. The front-wheel steering-angle control unit 73 rotates the electric motor 54 on the basis of a signal indicating a steering-angle correction amount received from the main controller 70.

The main controller 70 is connected to an engine control unit 81, a transmission control unit 82, a road-surface friction coefficient estimating device 83 serving as road-surface friction coefficient estimating unit, a lateral-acceleration sensor 84, and a yaw-rate sensor 85, and receives therefrom signals indicating an engine torque $T_{eg}$, an engine speed $N_e$, a main transmission gear ratio i, a turbine speed $N_t$ of a torque converter, a road-surface friction coefficient μ, a lateral acceleration $(d^2y/dt^2)$, and a yaw rate γ.

The main controller 70 has various control functions that are executed in accordance with these input signals. Specifically, the control functions include traction control for limiting the engine output to a predetermined value by outputting a signal to the engine control unit 81, front-rear driving-force distribution control for controlling the distribution of driving forces between the front and rear axles by outputting a signal to the transfer-clutch drive control unit 71, left-right driving-force distribution control for controlling the distribution of driving forces between the left and right rear wheels by outputting a signal to the hydraulic-pump-motor drive control unit 72, and front-wheel steering-angle control for correcting the steering angle of the front wheels by outputting a signal to the front-wheel steering-angle control unit 73.

Consequently, referring to FIG. 2, the main controller 70 mainly includes a front-rear ground-load calculating portion 70a, a left-wheel load-ratio calculating portion 70b, an individual-wheel ground-load calculating portion 70c, an individual-wheel lateral-force calculating portion 70d, an individual-wheel permissible-driving-force calculating portion 70e, a permissible engine-torque calculating portion 70f, a front-rear-driving-force-distribution-ratio calculating portion 70g, a transfer-clutch-torque calculating portion 70h, a rear-wheel left-right-driving-force-distribution-ratio calculating portion 70i, a rear-wheel torque-shift-amount calculating portion 70j, a yaw-moment calculating portion 70k, and a steering-angle correction-amount calculating portion 70l.

The front-rear ground-load calculating portion 70a receives the engine torque $T_{eg}$ and the engine speed $N_e$ from the engine control unit 81, and also receives the main transmission gear ratio i and the turbine speed $N_t$ of the torque converter from the transmission control unit 82.

The front-rear ground-load calculating portion 70a then calculates a front-wheel ground load $F_{zf}$ from the following expression (1) and a rear-wheel ground load $F_{zr}$ from the following expression (2), and outputs the calculated values to the individual-wheel ground-load calculating portion 70c.

$$F_{zf} = W_f - ((m \cdot A_x \cdot h)/L) \quad (1)$$

$$F_{zr} = W - F_{zf} \quad (2)$$

Here, $W_f$ indicates a front-wheel static load, m indicates a vehicle mass, h indicates the height of the center of mass, L indicates a wheel base, W indicates the weight of the vehicle (=m·G; G being gravitational acceleration), and $A_x$ indicates a longitudinal acceleration (=$F_x$/m).

$F_x$ in the arithmetic expression for determining the longitudinal acceleration $A_x$ indicates a total driving force, which can be calculated from, for example, the following expression (3):

$$F_x = T_t \cdot \eta \cdot i_f / R_t \quad (3)$$

where $\eta$ indicates a transmission efficiency of the driving system, $i_f$ indicates a final gear ratio, and $R_t$ indicates a tire radius. Furthermore, $T_t$ indicates a transmission output torque, which can be calculated from the following expression (4):

$$T_t = T_{eg} \cdot t \cdot i \quad (4)$$

where t indicates a torque ratio of the torque converter, which is determined by referring to a preliminarily set map that shows a relationship between a rotational velocity ratio e (=$N_t/N_e$) of the torque converter and a torque ratio of the torque converter.

The left-wheel load-ratio calculating portion 70b receives the lateral acceleration ($d^2y/dt^2$) from the lateral-acceleration sensor 84. The left-wheel load-ratio calculating portion 70b then calculates a left-wheel load-ratio $WR_{\_l}$ from the following expression (5) and outputs the calculated left-wheel load-ratio $WR_{\_l}$ to the individual-wheel ground-load calculating portion 70c and the individual-wheel lateral-force calculating portion 70d.

$$WR_{\_l} = 0.5 - ((d^2y/dt^2)/G) \cdot (h/L_{tred}) \quad (5)$$

Here, $L_{tred}$ indicates an average tread value between the front and rear wheels.

The individual-wheel ground-load calculating portion 70c receives the front-wheel ground load $F_{zf}$ and the rear-wheel ground load $F_{zr}$ from the front-rear ground-load calculating portion 70a, and also receives the left-wheel load-ratio $WR_{\_l}$ from the left-wheel load-ratio calculating portion 70b. The individual-wheel ground-load calculating portion 70c then calculates a left-front-wheel ground load $F_{zf\_l}$, a right-front-wheel ground load $F_{zf\_r}$, a left-rear-wheel ground load $F_{zr\_l}$, and a right-rear-wheel ground load $F_{zr\_r}$ from the following expressions (6), (7), (8), and (9), respectively, and outputs these calculated values to the individual-wheel permissible-driving-force calculating portion 70e. In other words, the individual-wheel ground-load calculating portion 70c is provided as ground-load estimating unit.

$$F_{zf\_l} = F_{zf} \cdot WR_{\_l} \quad (6)$$

$$F_{zf\_r} = F_{zf}(1 - WR_{\_l}) \quad (7)$$

$$F_{zr\_l} = F_{zr} \cdot WR_{\_l} \quad (8)$$

$$F_{zr\_r} = F_{zr} \cdot (1 - WR_{\_l}) \quad (9)$$

The individual-wheel lateral-force calculating portion 70d receives the lateral acceleration ($d^2y/dt^2$) from the lateral-acceleration sensor 84, the yaw rate $\gamma$ from the yaw-rate sensor 85, and the left-wheel load-ratio $WR_{\_l}$ from the left-wheel load-ratio calculating portion 70b. The individual-wheel lateral-force calculating portion 70d then calculates a front-wheel lateral force $F_{yf}$ from the following expression (10) and a rear-wheel lateral force $F_{yr}$ from the following expression (11). Based on the front-wheel lateral force $F_{yf}$ and the rear-wheel lateral force $F_{yr}$, the individual-wheel lateral-force calculating portion 70d calculates a left-front-wheel lateral force $F_{yf\_l}$, a right-front-wheel lateral force $F_{yf\_r}$, a left-rear-wheel lateral force $F_{yr\_l}$, and a right-rear-wheel lateral force $F_{yr\_r}$ from the following expressions (12) to (15), and outputs these calculated values to the individual-wheel permissible-driving-force calculating portion 70e. In other words, the individual-wheel lateral-force calculating portion 70d is provided as lateral-tire-force estimating unit.

$$F_{yf} = (I_z \cdot (d\gamma/dt) + m \cdot (d^2y/dt^2) \cdot L_r)/L \quad (10)$$

$$F_{yr} = (-I_z \cdot (d\gamma/dt) + m \cdot (d^2y/dt^2) \cdot L_f)/L \quad (11)$$

Here, $I_z$ indicates a yaw moment of inertia of the vehicle, $L_r$ indicates a distance between the rear axle and the center of mass, and $L_f$ indicates a distance between the front axle and the center of mass.

$$F_{yf\_l} = F_{yf} \cdot WR_{\_l} \quad (12)$$

$$F_{yf\_r} = F_{yf}(1 - WR_{\_l}) \quad (13)$$

$$F_{yr\_l} = F_{yr} \cdot WR_{\_l} \quad (14)$$

$$F_{yr\_r} = F_{yr} \cdot (1 - WR_{\_l}) \quad (15)$$

The individual-wheel permissible-driving-force calculating portion 70e receives the road-surface friction coefficient $\mu$ from the road-surface friction coefficient estimating device 83, receives the left-front-wheel ground load $F_{zf\_l}$, the right-front-wheel ground load $F_{zf\_r}$, the left-rear-wheel ground load $F_{zr\_l}$, and the right-rear-wheel ground load $F_{zr\_r}$ from the individual-wheel ground-load calculating portion 70c, and also receives the left-front-wheel lateral force $F_{yf\_l}$, the right-front-wheel lateral force $F_{yf\_r}$, the left-rear-wheel lateral force $F_{yr\_l}$, and the right-rear-wheel lateral force $F_{yr\_r}$ from the individual-wheel lateral-force calculating portion 70d. Then, based on the following expressions (16) to (19), the individual-wheel permissible-driving-force calculating portion 70e calculates front-rear permissible driving forces of the respective wheels as a left-front-wheel permissible driving force $F_{x0f\_l}$, a right-front-wheel permissible driving force $F_{x0f\_r}$, a left-rear-wheel permissible driving force $F_{x0r\_l}$, and a right-rear-wheel permissible driving force $F_{x0r\_r}$. The individual-wheel permissible-driving-force calculating portion 70e then outputs these calculated values to the permissible engine-torque calculating portion 70f, the front-rear-driving-force-distribution-ratio calculating portion 70g, the rear-wheel left-right-driving-force-distribution-ratio calculating portion 70i, and the yaw-moment calculating portion 70k. In other words, the individual-wheel permissible-driving-force calculating portion 70e is provided as permissible driving-force calculating unit.

$$F_{x0f\_l} = ((\mu \cdot F_{zf\_l})^2 - F_{yf\_l}^2)^{1/2} \quad (16)$$

$$F_{x0f\_r} = ((\mu \cdot F_{zf\_r})^2 - F_{yf\_r}^2)^{1/2} \quad (17)$$

$$F_{x0r\_l} = ((\mu \cdot F_{zr\_l})^2 - F_{yr\_l}^2)^{1/2} \quad (18)$$

$$F_{x0r\_r} = ((\mu \cdot F_{zr\_r})^2 - F_{yr\_r}^2)^{1/2} \quad (19)$$

The permissible engine-torque calculating portion 70f receives the main transmission gear ratio i from the transmission control unit 82, and also receives the left-front-wheel permissible driving force $F_{x0f\_l}$, the right-front-wheel permissible driving force $F_{x0f\_r}$, the left-rear-wheel permissible driving force $F_{x0r\_l}$, and the right-rear-wheel permissible driving force $F_{x0r\_r}$ from the individual-wheel permissible-driving-force calculating portion 70e. The permissible engine-torque calculating portion 70f then calculates a permissible engine torque $T_{EG0}$ from the following expression (20), and outputs the calculated permissible engine torque $T_{EG0}$ to the engine control unit 81. Upon receiving the permissible engine torque $T_{EG0}$, the engine control unit 81 performs engine control so as to limit the engine output to an amount equal to or lower than the permissible engine torque $T_{EGO}$. In other words, the permissible engine-torque calculating portion 70f and the engine control unit 81 are provided as engine-output controlling unit.

$$T_{EGO}=((F_{x0f\_l}+F_{x0f\_r}+F_{x0r\_l}+F_{x0r\_r})\cdot R_t)/(i_f\cdot i) \quad (20)$$

The front-rear-driving-force-distribution-ratio calculating portion 70g receives the left-front-wheel permissible driving force $F_{x0f\_l}$, the right-front-wheel permissible driving force $F_{x0f\_r}$, the left-rear-wheel permissible driving force $F_{x0r\_l}$, and the right-rear-wheel permissible driving force $F_{x0r\_r}$ from the individual-wheel permissible-driving-force calculating portion 70e. The front-rear-driving-force-distribution-ratio calculating portion 70g then calculates a front-rear driving-force distribution ratio $D_{AWD}$ from the following expression (21), and outputs the calculated front-rear driving-force distribution ratio $D_{AWD}$ to the transfer-clutch-torque calculating portion 70h.

$$D_{AWD}=(F_{x0f\_l}+F_{x0f\_r})/(F_{x0f\_l}+F_{x0f\_r}+F_{x0r\_l}+F_{x0r\_r}) \quad (21)$$

The transfer-clutch-torque calculating portion 70h receives the engine torque $T_{eg}$ from the engine control unit 81 and the front-rear driving-force distribution ratio $D_{AWD}$ from the front-rear-driving-force-distribution-ratio calculating portion 70g. The transfer-clutch-torque calculating portion 70h then calculates a transfer-clutch torque $T_{AWD}$ with respect to the transfer clutch 18 from the following expression (22), and outputs the calculated transfer-clutch torque $T_{AWD}$ to the transfer-clutch drive control unit 71.

$$T_{AWD}=T_{eg}\cdot i\cdot(D_0-D_{AWD}) \quad (22)$$

Here, $D_0$ indicates a front-rear torque distribution ratio by the center differential device 5. If the front axle and the rear axle have a ratio of 50:50, the front-rear torque distribution ratio is 0.5. If the front axle and the rear axle have a ratio of 40:60, the front-rear torque distribution ratio is 0.4. If the vehicle is a front-engine front-drive based (FF-based) four-wheel-drive vehicle, the front-rear torque distribution ratio is 1.0. If the vehicle is a front-engine rear-drive based (FR-based) four-wheel-drive vehicle, the front-rear torque distribution ratio is 0.

Accordingly, in this embodiment, the front-rear-driving-force-distribution-ratio calculating portion 70g, the transfer-clutch-torque calculating portion 70h, and the transfer-clutch drive control unit 71 constitute front-rear driving-force distribution controlling unit as an example of vehicle-behavior controlling unit.

The rear-wheel left-right-driving-force-distribution-ratio calculating portion 70i receives the left-rear-wheel permissible driving force $F_{x0r\_l}$ and the right-rear-wheel permissible driving force $F_{x0r\_r}$ from the individual-wheel permissible-driving-force calculating portion 70e. The rear-wheel left-right-driving-force-distribution-ratio calculating portion 70i then calculates a rear-wheel left-right driving-force distribution ratio $D_{TVD\_r}$ from the following expression (23), and outputs the calculated rear-wheel left-right driving-force distribution ratio $D_{TVD\_r}$ to the rear-wheel torque-shift-amount calculating portion 70j.

$$D_{TVD\_r}=F_{x0r\_l}/(F_{x0r\_l}+F_{x0r\_r}) \quad (23)$$

The rear-wheel torque-shift-amount calculating portion 70j receives the engine torque $T_{eg}$ from the engine control unit 81, the front-rear driving-force distribution ratio $D_{AWD}$ from the front-rear-driving-force-distribution-ratio calculating portion 70g, and the rear-wheel left-right-driving-force distribution ratio $D_{TVD\_r}$ from the rear-wheel left-right-driving-force-distribution-ratio calculating portion 70i. The rear-wheel torque-shift-amount calculating portion 70j then calculates a rear-wheel torque shift amount $T_{TVD\_r}$ with respect to the hydraulic motor 22 from the following expression (24). In this case, torque shift from the right wheel towards the left wheel is defined as positive. The rear-wheel torque-shift-amount calculating portion 70j then outputs the calculated rear-wheel torque shift amount $T_{TVD\_r}$ to the hydraulic-pump-motor drive control unit 72.

$$T_{TVD\_r}=T_{eg}\cdot i\cdot(1-D_{AWD})\cdot i_f\cdot(0.5-D_{TVD\_r}) \quad (24)$$

Accordingly, in this embodiment, the rear-wheel left-right-driving-force-distribution-ratio calculating portion 70i, the rear-wheel torque-shift-amount calculating portion 70j, and the hydraulic-pump-motor drive control unit 72 constitute left-right driving-force distribution controlling unit as an example of vehicle-behavior controlling unit.

The yaw-moment calculating portion 70k receives the left-front-wheel permissible driving force $F_{x0f\_l}$, the right-front-wheel permissible driving force $F_{x0f\_r}$, the left-rear-wheel permissible driving force $F_{x0r\_l}$ and the right-rear-wheel permissible driving force $F_{x0r\_r}$ from the individual-wheel permissible-driving-force calculating portion 70e. The yaw-moment calculating portion 70k then calculates a yaw moment $M_z$ occurring due to a difference in driving forces between the left and right wheels from the following expression (25), and outputs the calculated yaw moment $M_z$ to the steering-angle correction-amount calculating portion 70l. In this case, a positive sign indicates a left turning direction.

$$M_z=(-F_{x0f\_l}+F_{x0f\_r}-F_{x0r\_l}+F_{x0r\_r})\cdot L_{tred} \quad (25)$$

The steering-angle correction-amount calculating portion 70l receives the yaw moment $M_z$ occurring due to a difference in driving forces between the left and right wheels from the yaw-moment calculating portion 70k. The steering-angle correction-amount calculating portion 70l then calculates a steering-angle correction amount $\Delta\delta$ from the following expression (26), and outputs the calculated steering-angle correction amount $\Delta\delta$ to the front-wheel steering-angle control unit 73.

$$\Delta\delta=\pm M_z/(2\cdot Cp) \quad (26)$$

Here, Cp indicates an equivalent cornering power of the tires. The steering-angle correction amount $\Delta\delta$ has a negative (−) sign in the case of front wheels and a positive (+) sign in the case of rear wheels. Since the steering-angle correction is implemented with respect to the front wheels in this embodiment, the steering-angle correction amount $\Delta\delta$ has a negative (−) sign. In contrast, if the vehicle has a known rear-wheel steering function, the steering-angle correction amount $\Delta\delta$ will have a positive (+) sign.

Specifically, with the front-wheel steering-angle control according to this embodiment, the steering angle of the front or rear wheels is controlled to cancel out a yaw moment occurring as a result of driving-force distribution control, thereby realizing maximum traction performance while achieving high steering stability. In this embodiment, the yaw-moment calculating portion 70k, the steering-angle correction-amount calculating portion 70l, and the front-wheel steering-angle control unit 73 constitute steering-angle controlling unit as an example of vehicle-behavior controlling unit. As mentioned above, as an alternative to correcting the steering angle of the front wheels, the steering angle of the rear wheels may be corrected by means of a rear-wheel steering mechanism.

A main control program performed by the main controller 70 will now be described with reference to the flow chart in FIG. 3.

In step S101, required parameters are read, which include signals indicating an engine torque $T_{eg}$, an engine speed $N_e$, a main transmission gear ratio i, a turbine speed $N_t$ of the torque converter, a road-surface friction coefficient μ, a lateral acceleration ($d^2y/dt^2$), and a yaw rate γ.

In step S102, the front-rear ground-load calculating portion 70a calculates a front-wheel ground load $F_{zf}$ and a rear-wheel ground load $F_{zr}$ respectively from the aforementioned expressions (1) and (2).

In step S103, the left-wheel load-ratio calculating portion 70b calculates a left-wheel load-ratio $WR_{\_l}$ from the aforementioned expression (5).

In step S104, the individual-wheel ground-load calculating portion 70c calculates a left-front-wheel ground load $F_{zf\_l}$, a right-front-wheel ground load $F_{zf\_r}$, a left-rear-wheel ground load $F_{zr\_l}$, and a right-rear-wheel ground load $F_{zr\_r}$ from the aforementioned expressions (6) to (9), respectively.

In step S105, the individual-wheel lateral-force calculating portion 70d calculates a left-front-wheel lateral force $F_{yf\_l}$ a right-front-wheel lateral force $F_{yf\_r}$ a left-rear-wheel lateral force $F_{yr\_l}$, and a right-rear-wheel lateral force $F_{yr\_r}$ from the aforementioned expressions (12) to (15), respectively.

In step S106, the individual-wheel permissible-driving-force calculating portion 70e calculates a left-front-wheel permissible driving force $F_{x0f\_l}$, a right-front-wheel permissible driving force $F_{x0f\_r}$, a left-rear-wheel permissible driving force $F_{x0r\_l}$, and a right-rear-wheel permissible driving force $F_{x0r\_r}$ from the aforementioned expressions (16) to (19), respectively.

In step S107, the permissible engine-torque calculating portion 70f calculates a permissible engine torque $T_{EG0}$ from the aforementioned expression (20) and outputs the calculated permissible engine torque $T_{EG0}$ to the engine control unit 81. Upon receiving the permissible engine torque $T_{EG0}$, the engine control unit 81 performs engine control so as to limit the engine output to an amount equal to or lower than the permissible engine torque $T_{EG0}$.

In step S108, the front-rear-driving-force-distribution-ratio calculating portion 70g calculates a front-rear driving-force distribution ratio $D_{AWD}$ from the aforementioned expression (21).

In step S109, the transfer-clutch-torque calculating portion 70h calculates a transfer-clutch torque $T_{AWD}$ from the aforementioned expression (22) and outputs the calculated transfer-clutch torque $T_{AWD}$ to the transfer-clutch drive control unit 71.

In step S110, the rear-wheel left-right-driving-force-distribution-ratio calculating portion 70i calculates a rear-wheel left-right driving-force distribution ratio $D_{TVD\_r}$ from the aforementioned expression (23).

In step S111, the rear-wheel torque-shift-amount calculating portion 70j calculates a rear-wheel torque shift amount $T_{TVD\_r}$ from the aforementioned expression (24) and outputs the calculated rear-wheel torque shift amount $T_{TVD\_r}$ to the hydraulic-pump-motor drive control unit 72.

In step S112, the yaw-moment calculating portion 70k calculates a yaw moment $M_z$ occurring due to a difference in driving forces between the left and right wheels from the aforementioned expression (25).

In step S113, the steering-angle correction-amount calculating portion 70l calculates a steering-angle correction amount Δδ from the aforementioned expression (26) and outputs the calculated steering-angle correction amount Δδ to the front-wheel steering-angle control unit 73. The process then exits the program.

According to this embodiment of the present invention, the permissible driving forces $F_{x0f\_l}$, $F_{x0f\_r}$, $F_{x0r\_l}$, and $F_{x0r\_r}$ of the individual wheels are calculated from the road-surface friction coefficient μ, the ground loads $F_{zf\_l}$, $F_{zf\_r}$, $F_{zr\_l}$, and $F_{zr\_r}$ of the individual wheels, and the lateral forces $F_{yf\_l}$, $F_{yf\_r}$, $F_{yr\_l}$, and $F_{yr\_r}$ of the individual wheels. The permissible engine torque $T_{EG0}$ is calculated on the basis of these permissible driving forces $F_{x0f\_l}$, $F_{x0f\_r}$, $F_{x0r\_l}$, and $F_{x0r\_r}$, so as to limit the engine output. In addition, the transfer-clutch torque $T_{AWD}$ for front-rear driving-force distribution control, the rear-wheel torque shift amount $T_{TVD\_r}$ for left-right driving-force distribution control, and the steering-angle correction amount Δδ for steering-angle control are also calculated on the basis of the permissible driving forces $F_{x0f\_l}$, $F_{x0f\_r}$, $F_{x0r\_l}$, and $F_{x0r\_r}$.

Therefore, the engine output can be appropriately controlled while the driving forces can be distributed properly in accordance with the permissible driving forces of the individual wheels as a result of the front-rear driving-force distribution control or the left-right driving-force distribution control. This allows for maximum traction performance where each wheel is utilized at full. In addition, with the steering-angle control, the steering angle of the front or rear wheels is controlled to cancel out a yaw moment occurring as a result of driving-force distribution control, thereby realizing maximum traction performance with the driving-force distribution control while achieving high steering stability.

The front-rear driving-force distribution controlling mechanism defined by the center differential device 5, the left-right driving-force distribution controlling mechanism equipped with the hydraulic motor 22, and the front-wheel steering-angle controlling mechanism in the above embodiment of the present invention are only examples of the mechanisms. This implies that the present invention can be applied to examples where the front-rear driving-force distribution control, the left-right driving-force distribution control, and the steering-angle control are realized by means of other known mechanisms.

Although the left-right driving-force distribution control is performed with respect to the rear wheels in the above embodiment of the present invention, the control may alternatively be performed with respect to the front wheels. In that case, a front-wheel left-right driving-force distribution ratio $D_{TVD\_f}$ is calculated from the following expression (27):

$$D_{TVD\_f}=F_{x0f\_l}/(F_{x0f\_l}+F_{x0f\_r}) \tag{27}$$

Furthermore, a front-wheel torque shift amount $T_{TVD\_f}$ (torque shift from the right wheel towards the left wheel being defined as positive) is calculated from the following expression (28):

$$T_{TVD\_f}=T_{eg} \cdot i \cdot D_{AWD} \cdot i_f (0.5-D_{TVD\_f}) \tag{28}$$

Although the above embodiment of the present invention is directed to an example of a vehicle equipped with all three control functions, i.e. front-rear driving-force distribution control function, left-right driving-force distribution control function, and steering-angle control function, the present invention can alternatively be applied to a vehicle equipped with one of or two of the three control functions.

Although the main controller 70 is provided as an independent unit in the above embodiment of the present invention for the purpose of simplifying the explanation, the main controller 70 may alternatively be included as part of other control units (such as the engine control unit).

What is claimed is:

1. A vehicle control device comprising:
   road-surface friction coefficient estimating-unit configured to estimate a road-surface friction coefficient;

ground-load estimating-unit configured to estimate dynamic value ground loads acting on individual wheels;

lateral-tire-force estimating-unit configured to estimate lateral tire forces acting on the individual wheels;

permissible driving-force calculating-unit configured to calculate permissible front-rear driving forces of the individual wheels as permissible driving forces on the basis of the road-surface friction coefficient, the dynamic value ground loads of the individual wheels, and the lateral tire forces of the individual wheels;

engine-output controlling unit configured to control engine output on the basis of the permissible driving forces of the individual wheels; and vehicle-behavior controlling unit configured to control vehicle behavior on the basis of the permissible driving forces of the individual wheels.

2. The vehicle control device according to claim 1, wherein the vehicle-behavior controlling unit comprises front-rear driving-force distribution controlling unit being configured to control driving-force distribution between front and rear axles of a vehicle on the basis of the permissible driving forces of the individual wheels.

3. The vehicle control device according to claim 2, wherein the front-rear driving-force distribution controlling unit calculates a front-rear driving-force distribution ratio on the basis of the permissible driving forces of the individual wheels.

4. The vehicle control device according to claim 1, wherein the vehicle-behavior controlling unit comprises left-right driving-force distribution controlling unit being configured to control driving-force distribution between left and right wheels of the vehicle on the basis of the permissible driving forces of the individual wheels.

5. The vehicle control device according to claim 4, wherein the left-right driving-force distribution controlling unit calculates a left-right driving-force distribution ratio on the basis of the permissible driving forces of the individual wheels.

6. The vehicle control device according to claim 1, wherein the vehicle-behavior controlling unit comprises steering-angle controlling unit being configured to correct a steering angle on the basis of the permissible driving forces of the individual wheels.

7. The vehicle control device according to claim 6, wherein the steering-angle controlling unit calculates a yaw moment occurring due to a difference in driving forces between a left and right wheels on the basis of the permissible driving forces of the individual wheels.

8. The vehicle control device according to claim 1, wherein the vehicle-behavior controlling unit comprises at least one of a) to c):

a) a front-rear driving-force distribution controlling unit that is configured to control driving-force distribution between front and rear axles of a vehicle on the basis of the permissible driving forces of the individual wheels;

b) a left-right driving-force distribution controlling unit being configured to control driving-force distribution between left and right wheels of the vehicle on the basis of the permissible driving forces of the individual wheels;

c) a steering-angle controlling unit being configured to correct a steering angle on the basis of the permissible driving forces of the individual wheels.

9. The vehicle control device according to claim 8, wherein the vehicle-behavior controlling unit comprises at least two of a) to c).

10. The vehicle control device according to claim 8, wherein the vehicle-behavior controlling unit comprises all three of a) to c).

11. The vehicle control device according to claim 1, wherein the ground-load estimating-unit configured to estimate dynamic value ground loads acting on individual wheels factors in an acceleration value.

12. The vehicle control device according to claim 11, comprising a front-rear ground-load calculation portion in communication with said ground-load estimating-unit, and said front-rear ground-load calculation portion calculates a front-wheel ground load and a rear-wheel ground load with use of the acceleration value which comprises a longitudinal acceleration value.

13. The vehicle control device according to claim 12, wherein the front-rear ground-load calculation portion is configured to determine the front-wheel ground load and rear-wheel ground load though use of, in addition to the longitudinal acceleration value, wheel static load, vehicle weight, and a center of mass height of the vehicle.

14. A vehicle control device comprising:

road-surface friction coefficient estimating-unit configured to estimate a road-surface friction coefficient;

ground-load estimating-unit configured to estimate ground loads acting on individual wheels, wherein the ground-load estimating-unit factors in a longitudinal acceleration in estimating the ground loads acting on individual wheels;

lateral-tire-force estimating-unit configured to estimate lateral tire forces acting on the individual wheels;

permissible driving-force calculating-unit configured to calculate permissible front-rear driving forces of the individual wheels as permissible driving forces on the basis of the road-surface friction coefficient, the ground loads of the individual wheels, and the lateral tire forces of the individual wheels;

engine-output controlling unit configured to control engine output on the basis of the permissible driving forces of the individual wheels; and vehicle-behavior controlling unit configured to control vehicle behavior on the basis of the permissible driving forces of the individual wheels.

15. The vehicle control device according to claim 14, wherein the vehicle-behavior controlling unit comprises a front-rear driving-force distribution controlling unit configured to control driving-force distribution between front and rear axles of a vehicle on the basis of the permissible driving forces of the individual wheels.

16. The vehicle control device according to claim 14, wherein the vehicle-behavior controlling unit comprises a left-right driving-force distribution controlling unit being configured to control driving-force distribution between left and right wheels of the vehicle on the basis of the permissible driving forces of the individual wheels.

17. The vehicle control device according to claim 14, wherein the vehicle-behavior controlling unit comprises a steering-angle controlling unit configured to correct a steering angle on the basis of the permissible driving forces of the individual wheels.

18. The vehicle control device according to claim 14, comprising a front-rear ground-load calculation portion in communication with said ground-load estimating-unit, and said front-rear ground-load calculation portion calculates a front-wheel ground load and a rear-wheel ground load through use of the longitudinal acceleration.

19. The vehicle control device according to claim 18, wherein the front-rear ground-load calculation portion is configured to determine the front-wheel ground load and rear-wheel ground load though use of, in addition to the longitudinal acceleration value, wheel static load, vehicle weight, and a center of mass height of the vehicle.

20. The vehicle control device according to claim 19, wherein the front-rear ground-load calculation portion is configured to determine the front-wheel ground load and rear-wheel ground load though use of the following formula:

$$F_z = W_z - ((m \cdot A_x \cdot h)/L)$$

where, Fz represents a wheel ground load, Wz indicates a wheel static load, m indicates a vehicle mass, h indicates the height of the center of mass, L indicates a wheel base, and $A_x$ indicates the longitudinal acceleration.

21. A vehicle control device comprising:
road-surface friction coefficient estimating-unit configured to estimate a road-surface friction coefficient;
ground-load estimating-unit configured to estimate ground loads acting on individual wheels;
lateral-tire-force estimating-unit configured to estimate lateral tire forces acting on the individual wheels;
permissible driving-force calculating-unit configured to calculate permissible front-rear driving forces of the individual wheels as permissible driving forces on the basis of the road-surface friction coefficient, the ground loads of the individual wheels, and the lateral tire forces of the individual wheels;
engine-output controlling unit configured to control engine output on the basis of the permissible driving forces of the individual wheels; and
vehicle-behavior controlling unit configured to control vehicle behavior on the basis of the permissible driving forces of the individual wheels, and wherein the vehicle-behavior controlling unit comprises a front-rear driving-force distribution controlling unit configured to control driving-force distribution between front and rear axles of a vehicle on the basis of the permissible driving forces of the individual wheels.

22. A vehicle control device comprising:
road-surface friction coefficient estimating-unit configured to estimate a road-surface friction coefficient;
ground-load estimating-unit configured to estimate ground loads acting on individual wheels;
lateral-tire-force estimating-unit configured to estimate lateral tire forces acting on the individual wheels;
permissible driving-force calculating-unit configured to calculate permissible front-rear driving forces of the individual wheels as permissible driving forces on the basis of the road-surface friction coefficient, the ground loads of the individual wheels, and the lateral tire forces of the individual wheels;
engine-output controlling unit configured to control engine output on the basis of the permissible driving forces of the individual wheels; and
vehicle-behavior controlling unit configured to control vehicle behavior on the basis of the permissible driving forces of the individual wheels, and wherein the vehicle-behavior controlling unit comprises a steering-angle controlling unit configured to correct a steering angle on the basis of the permissible driving forces of the individual wheels.

23. A vehicle control device comprising:
road-surface friction coefficient estimating-unit configured to estimate a road-surface friction coefficient;
ground-load estimating-unit configured to estimate ground loads acting on individual wheels;
lateral-tire-force estimating-unit configured to estimate lateral tire forces acting on the individual wheels;
permissible driving-force calculating-unit configured to calculate permissible front-rear driving forces of the individual wheels as permissible driving forces on the basis of the road-surface friction coefficient, the ground loads of the individual wheels, and the lateral tire forces of the individual wheels;
engine-output controlling unit configured to control engine output on the basis of the permissible driving forces of the individual wheels; and
vehicle-behavior controlling unit configured to control vehicle behavior on the basis of the permissible driving forces of the individual wheels, and
wherein the vehicle-behavior controlling unit comprises a left-right driving-force distribution controlling unit configured to control driving-force distribution between left and right wheels of the vehicle on the basis of the permissible driving forces of the individual wheels, and
wherein the left-right driving-force distribution controlling unit calculates a left-right driving-force distribution ratio on the basis of the permissible driving forces of the individual wheels.

* * * * *